(12) United States Patent
Bourgeau

(10) Patent No.: US 7,880,342 B2
(45) Date of Patent: Feb. 1, 2011

(54) DC BUS REGULATOR

(75) Inventor: Edward P. Bourgeau, Houston, TX (US)

(73) Assignee: Transocean Sedco Forex Ventures Limited (KY)

( * ) Notice: Subject to any disclaimer, the term of this patent is extended or adjusted under 35 U.S.C. 154(b) by 183 days.

(21) Appl. No.: 12/269,703

(22) Filed: Nov. 12, 2008

(65) Prior Publication Data

US 2010/0118574 A1     May 13, 2010

(51) Int. Cl.
*G05F 3/06* (2006.01)
(52) U.S. Cl. .................................... 307/151
(58) Field of Classification Search .............. 307/151
See application file for complete search history.

(56) References Cited

U.S. PATENT DOCUMENTS

| 6,344,985 B1* | 2/2002 | Akerson ............ 363/65 |
| 2007/0069583 A1 | 3/2007 | Bourgeau et al. |

* cited by examiner

*Primary Examiner*—Robert L. Deberadinis
(74) *Attorney, Agent, or Firm*—Fulbright & Jaworski, LLP

(57) ABSTRACT

An improved DC bus regulator that utilizes more transistor packs for power conversion at some times and diode, SCR, and resistor packs at other times. The conversion technology is selected by the regulator based on the current load capacity and response required. For example, transistor packs may be used in low power load conditions. Through use of this hybrid system, the system obtains the desirable effects of transistor pack systems including fast response time, ability to regulate current, and bi-directional power conversion while mitigating the high costs and fragile nature of a system based solely on transistor packs.

59 Claims, 10 Drawing Sheets

DC BUS REGULATOR

TECHNICAL FIELD

This disclosure generally relates to power transmission networks. More specifically, this disclosure relates to operating a DC power system from one or more AC or DC power generators. Even more specifically, this disclosure relates to regulation of energy transfer between an AC and DC power network.

BACKGROUND OF THE INVENTION

Power transmissions networks can be made of AC systems, DC systems, or a combination of the two. AC power networks have conventionally been used throughout the world. However, DC power networks have certain advantages. DC power networks are easier to design and implement because they introduce no reactance into the power system. Higher efficiencies from generators can be achieved in DC systems because only real power is transmitted. Additionally, parallelization of power supplies is simple because the operating frequency of DC power supplies is 0 Hz. Therefore, no synchronization is required when additional supplies or loads are brought onto the network.

The conventional use of AC power networks is a result of the ease of transmitting AC power over long distances and handling voltage changes using transformers. However, over short distances, such as those in isolated environments, a DC power transmission network could be beneficial for the reasons previously explained. High-power generators available today typically produce AC power. Therefore, operation of a DC transmission network powered by AC generators requires conversion from AC to DC and vice versa.

Reliable operation of a power network is a critical element of many electronic systems, for example, on drilling platforms or vessels to operate onboard thrusters. Drilling vessels are not anchored in the ocean but are dynamically controlled to maintain a desired position in the ocean. Thrusters are used to maintain a position within specified tolerances of a drilling apparatus. Thrusters are propeller drives which can have variable rotation speed and azimuthal angle of the blades. These thrusters are operated by a power supply onboard the drilling vessel. Any failure of the power supply can lead to displacement of the vessel out of the tolerances of the drilling apparatus. In such a case, the drilling apparatus would need to be mechanically decoupled and recoupled after the power supply is restored and the position of the drilling vessel is corrected.

One method of facilitating a reliable power supply is to utilize a DC bus for powering thrusters and other components. Such a power transmission system is demonstrated in FIG. 1. In such a system, the power supply is generally made of AC generators coupled to an AC-to-DC converter. The AC-to-DC converter places power from the AC generators on an intermediate DC bus. The intermediate DC bus may be augmented with DC generators or a battery backup system. Each motor or thruster, as well as other devices utilizing the intermediate DC bus, on board the drilling vessel is coupled to the intermediate DC bus through a DC-to-AC converter.

FIG. 1 is a block diagram illustrating a conventional DC voltage bus coupling multiple AC voltage generation systems to various loads. Power system 100 includes generators 102. Generators 102 couple to AC bus 104 through isolators 106. Isolators 106 allow generators 102 to be removed from the bus when they are not needed or are malfunctioning. AC bus 104 couples to transformer 108 to condition the power for transmission to line 110. AC-to-DC converter 112 couples to line 110 and converts AC power to DC power for output onto intermediate DC bus 120. Coupled to DC bus 120 are DC-to-AC converters 130. DC-to-AC converters 130 convert DC power to AC power which most components are designed to use. Coupled to DC-to-AC converters 130 is line 132 to which loads may be connected. Motor 134 is coupled to line 132, and motor 134 could be, for example, a thruster. Additionally, transformer 135 is coupled to line 132 to condition power for load 136. Load 136 could be, for example, a light bulb.

There are several methods for implementing the AC-to-DC converter necessary for placing power from the AC generators on the intermediate DC bus. These methods conventionally employ the use of either diodes, silicon-controlled rectifiers (SCRs), or transistors.

One apparatus for AC-to-DC power conversion is a diode rectifier (or a diode pack). The are several forms of diode rectifiers commonly known. One typical diode rectifier is a full-wave diode rectifier. The AC power systems on drilling vessels typically utilize a three-phase waveform such that a six diode rectifier configuration is typically used. Diodes conduct current only when the voltage at the anode of the diode is greater than the voltage at the cathode of the diode. FIG. 2 is a schematic illustrating a conventional diode full-wave rectifier for three-phase AC power. Diode rectifier 200 accepts input from three-phase AC source 202. The rectifier 200 includes diodes 204 for rectifying the first phase, diodes 206 for rectifying the second phase, and diodes 208 for rectifying the third phase. Two diodes are needed in each case to produce output from both the positive AC cycle and the negative AC cycle. Diodes 204, diodes 206, and diodes 208 are coupled between the AC source 202 and the DC bus 210. Capacitor 212 is coupled to the DC bus 210 to average voltage ripples on DC bus 210. While rectifier 200 is shown as a single rectifier arrangement, several individual arrangements of one power capacity may be placed in parallel to create a rectifier 200 with a higher power capacity.

Diode rectifiers are commercially available from various vendors or can be constructed by arranging individually-purchased diodes. The advantages to diode rectifiers are the low cost of the components. Individual diodes and complete rectifiers are relatively inexpensive for high-power configurations, i.e., several megawatts (MW). Diodes are also relatively small devices compared to other available solutions at an equivalent power load. Diode rectifiers, however, have no ability to regulate the output voltage or current. Additionally, they only conduct in one direction.

As a result of the inability to regulate output voltage or current from diode rectifiers, SCRs, also known as thyristor rectifiers, have largely been used in their place. FIG. 3 is a schematic illustrating a conventional arrangement of SCRs for three-phase AC-to-DC conversion. SCR pack 300 accepts input from three-phase AC source 302. SCR pack 300 includes SCRs 304 for converting the first phase, SCRs 306 for converting the second phase, and SCRs 308 for converting the third phase. Each individual SCR includes a gate terminal 305 for accepting input. Two SCRs are needed in each case to produce output from both the positive AC cycle and the negative AC cycle. SCRs 304, SCRs 306, and SCRs 308 are coupled to AC source 302 and to DC bus 310. Capacitor 312 is coupled to the DC bus 310 to average ripples on DC bus 310. While SCR pack 300 is shown as a SCR arrangement, several individual arrangements of one power capacity may be placed in parallel to create a SCR pack 300 with a higher power capacity.

Output current may be regulated in the SCRs by controlling through gate terminal 305 when in the AC cycle they turn on.

SCRs also offer the low cost, small size, and reliability of diodes. The disadvantage of SCRs is their slow switching time that must occur in synchronization with the AC power supplies. As a result, they are not well suited to handle the power load changes experienced during instability in the power system. Additionally, once the SCR is turned on through gate terminal 305, it may not be turned off through gate terminal 305.

Transistors offer yet another solution for AC-to-DC power conversion. FIG. 4 is a schematic illustrating a conventional arrangement of transistors for three-phase AC-to-DC power conversion. Transistor pack 400 accepts input from three-phase AC source 402. Transistor pack 400 includes transistors 404 to convert the first phase, transistors 406 to convert the second phase, and transistors 408 to convert the third phase. Additionally, diodes 405 are coupled on both sides to transistors 404 to protect transistors 404 from damaging voltages which may develop across transistors 404 and complete the power transfer circuit. This setup is repeated for diodes 407 coupled to transistors 406 and diodes 409 coupled to transistors 408. Inductors 403 condition the power before reaching transistors 404, transistors 406, and transistors 408. Transistors 404, transistors 406, transistors 408 are coupled to AC source 402 and to DC bus 410. Capacitor 412 is coupled to the DC bus 410 to average ripples on DC bus 410. While transistor pack 400 is shown as a transistor arrangement, several individual arrangements of one power capacity may be placed in parallel to create a transistor pack 400 with a higher power capacity.

Transistors possess faster switching characteristics than SCRs as well as the ability to control on and off timing, making them a better solution under transients resulting from real loads. Additionally, transistors allow power flow in both directions through the converter. This allows power to be moved back from the DC bus to the AC bus. It is typically required that multiple transistor-based conversion devices be placed in parallel to handle large loads. Transistors are expensive devices relative to diodes and SCRs and occupy significantly larger amounts of space. Additionally, transistors are fragile and break easily.

Thus, there is a need for a power system that has the fast switching capability of transistors and the low cost, durability, and small footprint of diodes or SCRs.

BRIEF SUMMARY OF THE INVENTION

An apparatus for interfacing an AC bus and DC bus includes: a set of one or more transistors coupled to the AC bus and coupled to the DC bus; a set of one or more diodes coupled to the AC bus and coupled to the DC bus; and a microcontroller coupled to the set of one or more transistors configured to regulate the current flow through the set of one or more transistors and to regulate the current flow through the set of one or more diodes. The microcontroller can be configured to regulate current through the set of one or more diodes by regulating the voltage on the DC bus. The microcontroller can also be configured to regulate current flow through the set of one or more transistors and the set of one or more diodes such that substantially all power flows through the set of one or more transistors when the power load of the DC bus is within a first power range. The set of one or more transistors can have a first total power capacity and the set of one or more diodes can have a second total power capacity, where the first total power capacity is less than the second total power capacity, and which the first power range can be between zero and a level dynamically chosen, in part, based on the first total power capacity. The apparatus can also include a set of one or more power consuming or storing devices; and a switch coupled to the DC bus and to the set of one or more power consuming devices, in which the microcontroller is further configured to regulate power transfer to the set of one or more power consuming or storing devices. The set of one or more power consuming devices can include resistors. The set of one or more power consuming devices can include capacitors. The set of one or more transistors can includes one or more transistor packs, each transistor pack configured to operate as a separate unit. The apparatus can also include: a switch arranged between the AC bus and one of the transistor packs such that the transistor pack is not directly coupled to the AC bus, the switch coupled to the AC bus, an AC load device, and the transistor pack, in which the switch is configured to alternatively couple the transistor pack to the AC bus or the AC load device; in which the transistor pack is configured to perform AC to DC power conversion when coupled to the AC bus and the DC bus and to perform DC to AC power conversion when coupled to the DC bus and the AC load device.

An apparatus for interfacing an AC bus and DC bus includes: a set of one or more transistors coupled to the AC bus and coupled to the DC bus; a set of one or more SCRs coupled to the AC bus and coupled to the DC bus; and a first microcontroller coupled to the set of one or more transistors configured to regulate the current flow through the set of one or more transistors and to regulate the current flow through the set of one or more SCRs. The first microcontroller can be configured to regulate current through the set of one or more SCRs by regulating the voltage on the DC bus. The first microcontroller can further regulate current through the set of one or more SCRs by controlling the gates of the SCRs. The apparatus can also include: a second microcontroller coupled to the one or more SCRs; in which the first microcontroller regulates current through the set of one or more SCRs by signaling the second microcontroller. The microcontroller can be configured to regulate current flow through the set of one or more transistors and the set of one or more SCRs such that substantially all power flows through the set of one or more transistors when the power load of the DC bus is within a first power range. The set of one or more transistors can have a first total power capacity and the set of one or more SCRs can have a second total power capacity, where the first total power capacity is less than the second total power capacity, and which the first power range is between zero and a level that is dynamically chosen, in part, based on the first total power capacity. The apparatus can also include: a set of one or more power consuming devices; and a switch coupled to the DC bus and to the set of one or more power consuming devices, in which the first microcontroller is further configured to regulate power transfer to the set of one or more power consuming devices. The set of one or more power consuming devices can include resistors. The set of one or more power consuming devices can include capacitors.

A method for interfacing an AC bus coupled to a set of one or more generators with a DC bus includes: coupling a set of one or more transistors having a first total power capacity to the AC bus and to the DC bus; coupling a set of one or more diodes having a second total power capacity to the AC bus and to the DC bus; and regulating current flow through the set of one or more transistors and the set of one or more diodes such that substantially all power flows through the set of one or more transistors when the power load of the DC bus is within a first power range; wherein the first total power capacity is substantially less than the total power capacity of the set of one or more generators. The first power range can be selected, at least in part, to correspond to the power range in which the overall system, which includes the one or more generators, the AC bus, and the DC bus, is known to be less stable. The first power range can be between zero and a level. The level can be dynamically chosen, in part, based on the first total power capacity. The level can be dynamically chosen, in part, by the capacity of the one or more generators. The regulating current flow step can include regulating voltage on the DC bus. The method also can include: coupling, through a switch, the DC bus to a set of one or more power consuming or storing devices; regulating current flow through the set of one or more power consuming or storing devices when the power load of the DC bus is above a second level. The second level can be dynamically chosen, in part, based on the first total power capacity.

An apparatus for AC to DC and DC to AC power conversion includes: a set of one or more transistor packs, each transistor pack configured to operate as a separate unit coupled to an AC bus and a DC bus; a switch arranged between the AC bus and one of the transistor packs such that the transistor pack is not directly coupled to the AC bus, the switch coupled to the AC bus, an AC load device, and the transistor pack, in which the switch is configured to alternatively couple the transistor pack to the AC bus or the AC load device; in which the transistor pack is configured to perform AC to DC power conversion when coupled to the AC bus and the DC bus and to perform DC to AC power conversion when coupled to the DC bus and the AC load device. The apparatus can also include: a second switch arranged between the AC bus and a second one of the transistor packs such that the second transistor pack is not directly coupled to the AC bus, the switch coupled to the AC bus, an AC load device, and the second transistor pack, in which the switch is configured to alternatively couple the second transistor pack to the AC bus or the AC load device; in which the second transistor pack is configured to perform AC to DC power conversion when coupled to the AC bus and the DC bus and to perform DC to AC power conversion when coupled to the DC bus and the AC load device.

An apparatus for interfacing an AC bus and DC bus includes: a set of one or more transistors coupled to the AC bus and coupled to the DC bus; a set of one or more SCRs coupled to the AC bus and coupled to the DC bus; and a microcontroller coupled to the set of one or more transistors configured to regulate the current flow through the set of one or more transistors and to regulate the current flow through the set of one or more SCRs. The microcontroller can be configured to regulate current through the set of one or more SCRs by regulating the voltage on the DC bus. The microcontroller can be configured to regulate current flow through the set of one or more transistors and the set of one or more SCRs such that substantially all power flows through the set of one or more transistors when the power load of the DC bus is within a first power range. The set of one or more transistors can have a first total power capacity and the set of one or more SCRs can have a second total power capacity, where the first total power capacity is less than the second total power capacity, and which the first power range is between zero and a level that is dynamically chosen, in part, based on the first total power capacity. The apparatus can also include: a set of one or more power consuming or storing devices; and a switch coupled to the DC bus and to the set of one or more power consuming devices, in which the microcontroller is further configured to regulate power transfer to the set of one or more power consuming or storing devices. The set of one or more power consuming devices can include resistors. The set of one or more power consuming devices can include capacitors. The set of one or more transistors can include one or more transistor packs, each transistor pack configured to operate as a separate unit. The apparatus can also include: a switch arranged between the AC bus and one of the transistor packs such that the transistor pack is not directly coupled to the AC bus, the switch coupled to the AC bus, an AC load device, and the transistor pack, in which the switch is configured to alternatively couple the transistor pack to the AC bus or the AC load device; in which the transistor pack is configured to perform AC to DC power conversion when coupled to the AC bus and the DC bus and to perform DC to AC power conversion when coupled to the DC bus and the AC load device.

An apparatus for interfacing an AC bus and DC bus includes: a set of one or more transistors coupled to the AC bus and coupled to the DC bus; a set of one or more SCRs coupled to the AC bus and coupled to the DC bus; and a first microcontroller coupled to the set of one or more transistors configured to regulate the current flow through the set of one or more transistors and to regulate the current flow through the set of one or more SCRs. The first microcontroller can be configured to regulate current through the set of one or more SCRs by regulating the voltage on the DC bus. The first microcontroller can further regulates current through the set of one or more SCRs by controlling the gates of the SCRs. The apparatus can also include: a second microcontroller coupled to the one or more SCRs; in which the first microcontroller regulates current through the set of one or more SCRs by signaling the second microcontroller. The microcontroller can be configured to regulate current flow through the set of one or more transistors and the set of one or more SCRs such that substantially all power flows through the set of one or more transistors when the power load of the DC bus is within a first power range. The set of one or more transistors can have a first total power capacity and the set of one or more SCRs can have a second total power capacity, where the first total power capacity is less than the second total power capacity, and which the first power range is between zero and a level that is dynamically chosen, in part, based on the first total power capacity. The apparatus can also include: a set of one or more power consuming devices; and a switch coupled to the DC bus and to the set of one or more power consuming devices, in which the first microcontroller is further configured to regulate power transfer to the set of one or more power consuming devices. The set of one or more power consuming devices can include resistors. The set of one or more power consuming devices can include capacitors.

A method for interfacing an AC bus coupled to a set of one or more generators with a DC bus includes: coupling a set of one or more transistors having a first total power capacity to the AC bus and to the DC bus; coupling a set of one or more SCRs having a second total power capacity to the AC bus and to the DC bus; and regulating current flow through the set of one or more transistors and the set of one or more SCRs such that substantially all power flows through the set of one or more transistors when the power load of the DC bus is within a first power range; wherein the first total power capacity is substantially less than the total power capacity of the set of one or more generators. The first power range can be selected, at least in part, to correspond to the power range in which the overall system, which includes the one or more generators, the AC bus, and the DC bus, is known to be less stable. The first power range can be between zero and a level. The level can be dynamically chosen, in part, based on the first total power capacity. The level can be dynamically chosen, in part, based on the capacity of the one or more generators. The regulating current flow step can include regulating voltage on the DC bus. The method can also include: coupling, through a switch, the DC bus to a set of one or more power consuming or storing devices; regulating current flow through the set of one or more power consuming or storing devices when the power load of the DC bus is above a second level. The second level can be dynamically chosen, in part, based on the first total power capacity.

An apparatus for AC to DC and DC to AC power conversion includes: a set of one or more transistor packs, each transistor pack configured to operate as a separate unit coupled to an AC bus and a DC bus a switch arranged between the AC bus and one of the transistor packs such that the transistor pack is not directly coupled to the AC bus, the switch coupled to the AC bus, an AC load device, and the transistor pack, in which the switch is configured to alternatively couple the transistor pack to the AC bus or the AC load device; in which the transistor pack is configured to perform AC to DC power conversion when coupled to the AC bus and the DC bus and to perform DC to AC power conversion when coupled to the DC bus and the AC load device. The apparatus can also include: a second switch arranged between the AC bus and a second one of the transistor packs such that the second transistor pack is not directly coupled to the AC bus, the switch coupled to the AC bus, an AC load device, and the second transistor pack, in which the switch is configured to alternatively couple the second transistor pack to the AC bus or the AC load device; in which the second transistor pack is configured to perform AC to DC power conversion when coupled to the AC bus and the DC bus and to perform DC to AC power conversion when coupled to the DC bus and the AC load device.

An apparatus for use in with an AC generator, an AC load, and a DC bus, includes: a transistor pack configured to perform AC-to-DC power conversion and DC-to-AC power conversion, the transistor pack including at least a first input and a second input; a first switch coupled to the AC generator, the AC load, the DC bus, and the first input of the transistor pack, the first switch arranged to connect the first input of the transistor pack to the AC generator, the AC load, or the DC bus; a second switch coupled to the AC generator, the AC load, the DC bus, and the second input of the transistor pack, the second switch arranged to connect the second input of the transistor pack to the AC generator, the AC load, or the DC bus; and a microcontroller configured to, in a first instance, instruct the first switch and the second switch to connect the first and second inputs of the transistor pack so that the transistor pack may convert AC power from the AC generator to DC power for the DC bus and to, in a second instance, instruct the first switch and the second switch to connect the first and second inputs of the transistor pack so that the transistor pack may convert DC power from the DC bus to AC power for the AC load. The microcontroller may be configured to instruct the first switch to connect the first input of the transistor pack to the AC generator and instruct the second switch to connect the second input of the transistor pack to the DC bus so that the transistor pack may convert AC power from the AC generator to DC power for the DC bus, and may be further configured to instruct the first switch to connect the first input of the transistor pack to the DC bus and instruct the second switch to connect the second input of the transistor pack to the AC load so that the transistor pack may convert DC power from the DC bus to AC power for the AC load.

A method for using a transistor pack capable of performing AC-to-DC, DC-to-AC, or DC-to-DC conversion in conjunction with a generator, a load, and a DC bus, includes: coupling the transistor pack to the generator and the DC bus such that the transistor pack may perform AC-to-DC or DC-to-DC conversion. The method also includes coupling the transistor pack to the DC bus and the load such that the transistor pack may perform DC-to-AC conversion or DC-to-DC conversion.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Fast switching characteristics in a DC bus regulator are more likely to be needed at some times than others. Under certain conditions it is more likely that the load scenario can be unpredictable and experience rapid changes making fast switching necessary to maintain the stability of the power system. For example, in the case of a power system on an offshore drilling rig, the power system tends to be unstable where the loads are small compared to the online generator capacity. Under these unstable conditions, the quick reaction time of transistors is desirable. However, when the power system is stable, fast switching may not be required. Where the fast switching of transistors is not needed, diodes or SCRs may be a more durable and cost-effective solution for power conversion.

By recognizing that the fast switching ability of transistors are only needed during certain system conditions, such as low power load as compared to generator capacity scenarios for an offshore drilling rig power system, a system may be designed to include transistors capable of only handling a fraction of the total power load along with diode or SCRs to handle the remaining load. Thus, such a hybrid system may be reduced in size and cost as compared to an all transistor system for the same total power load while still maintaining fast switching ability when needed. Realization of such a system is not possible by simply combining the two technologies since both technologies perform generally the same function. Rather, creation of a hybrid system requires utilizing a control system that recognizes power conditions during which fast switching is more likely to be needed and power conditions during which the system is likely to be more stable.

Figure 5:
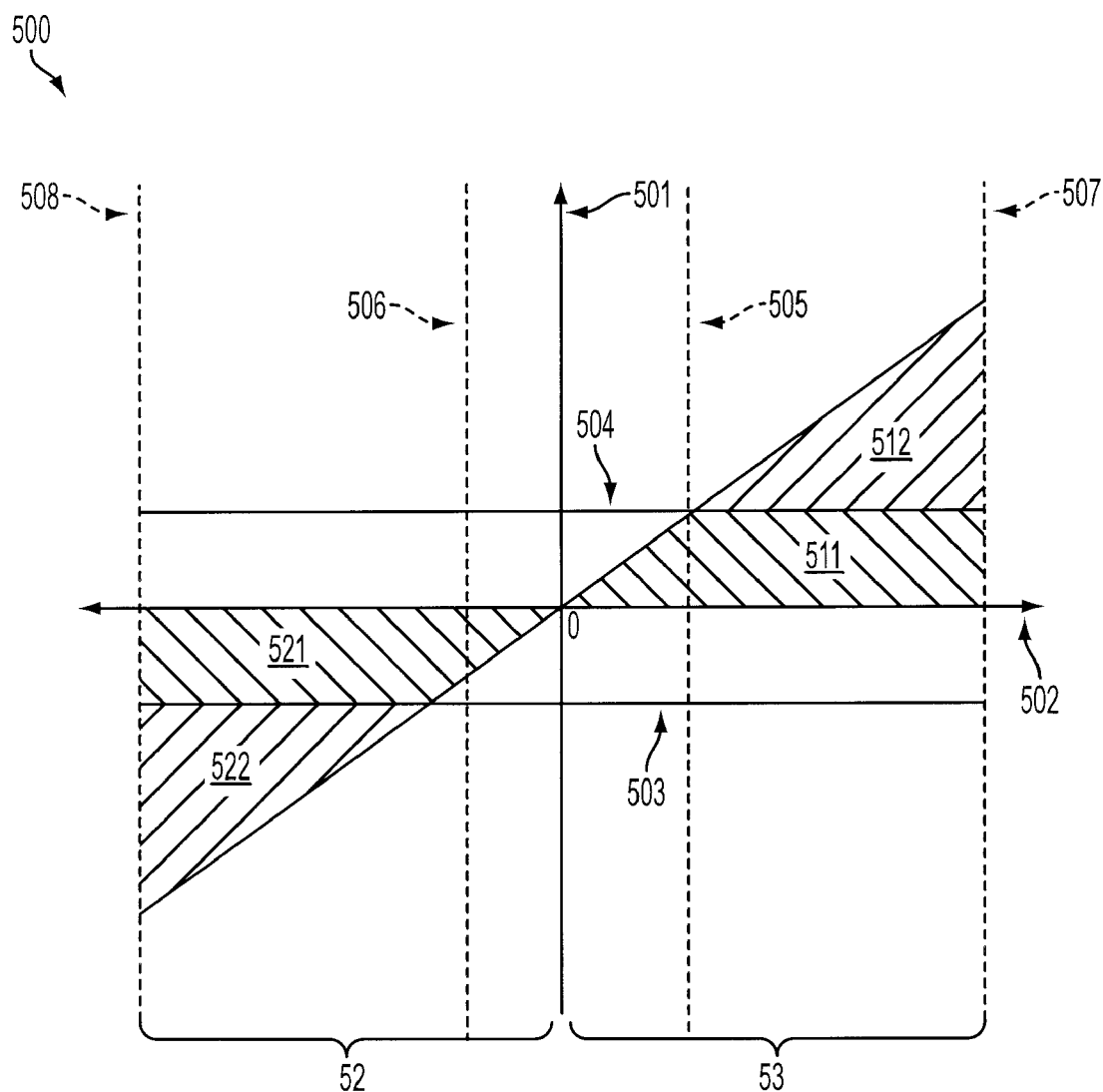
FIG. 5 is a graph illustrating the different operating regions experienced by a power conversion system according to one embodiment of the invention.

FIG. 5 is a graph illustrating the different operating regions experienced by an exemplary DC bus regulator in an offshore drilling rig power system according to one embodiment of the invention. Chart 500 plots power flow through the DC bus regulator on y-axis 501 versus power consumption by the DC bus on x-axis 502. Lines 503, 504, 505, and 506 represent the total capacity of the transistors included in the exemplary DC bus regulator, which is only a fraction of the total capacity of the system, as illustrated by lines 507 and 508. Region 51 covers forward conduction from the AC generators to the DC bus. Region 51 has two operational modes. In region 511, the transistors are in forward conduction. In region 512, the transistor capacity has been exceeded and diodes are switched on to assist in handling the larger load. Region 52 covers reverse conduction from the DC bus to the AC generators. Region 52 has two operational modes. In region 521, the transistors function in reverse conduction. In region 522, the capacity of the transistors has been exceeded and a set of resistors or other power consumption or storage devices are switched on to consume additional power off the DC bus. FIG. 5 illustrates one exemplary operating graph. Lines 503, 504, 505, and 506 may be pre-defined levels or dynamically chosen based on the operating conditions of the power system. Other alternatives are discussed below and those skilled in the art will recognize others based on the teachings herein.

Figure 2:
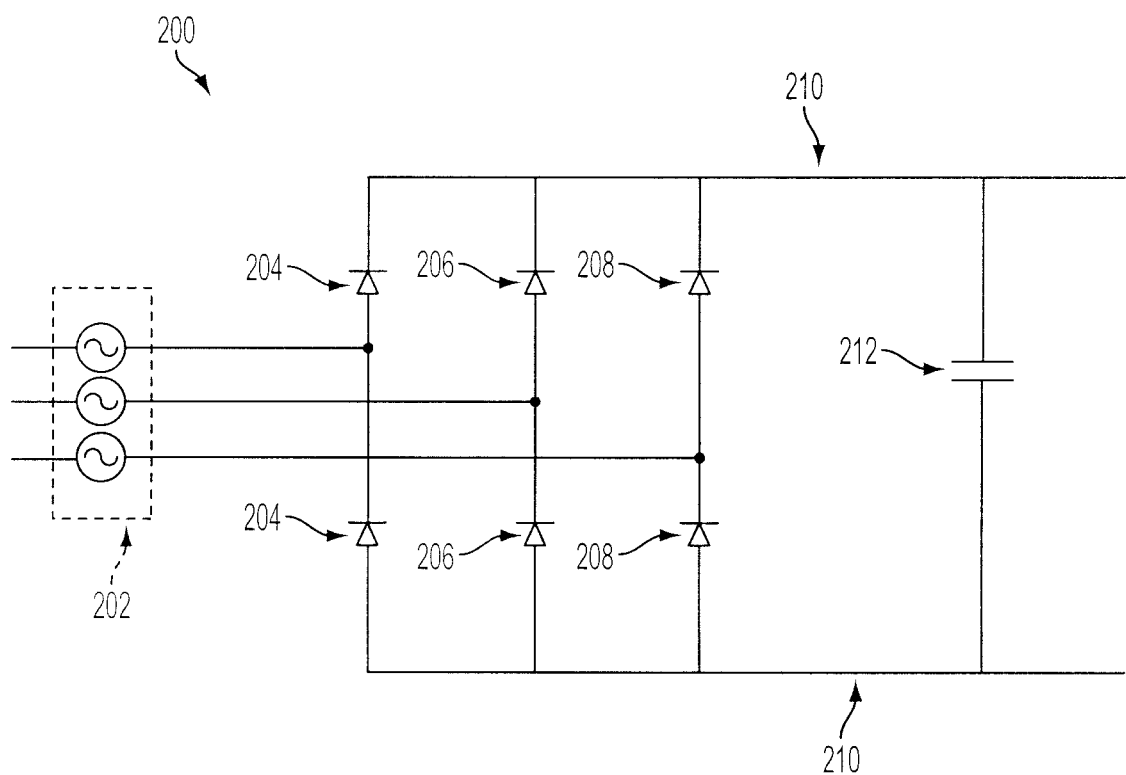
FIG. 2 is a schematic illustrating a conventional six diode full-wave diode rectifier.
Figure 4:
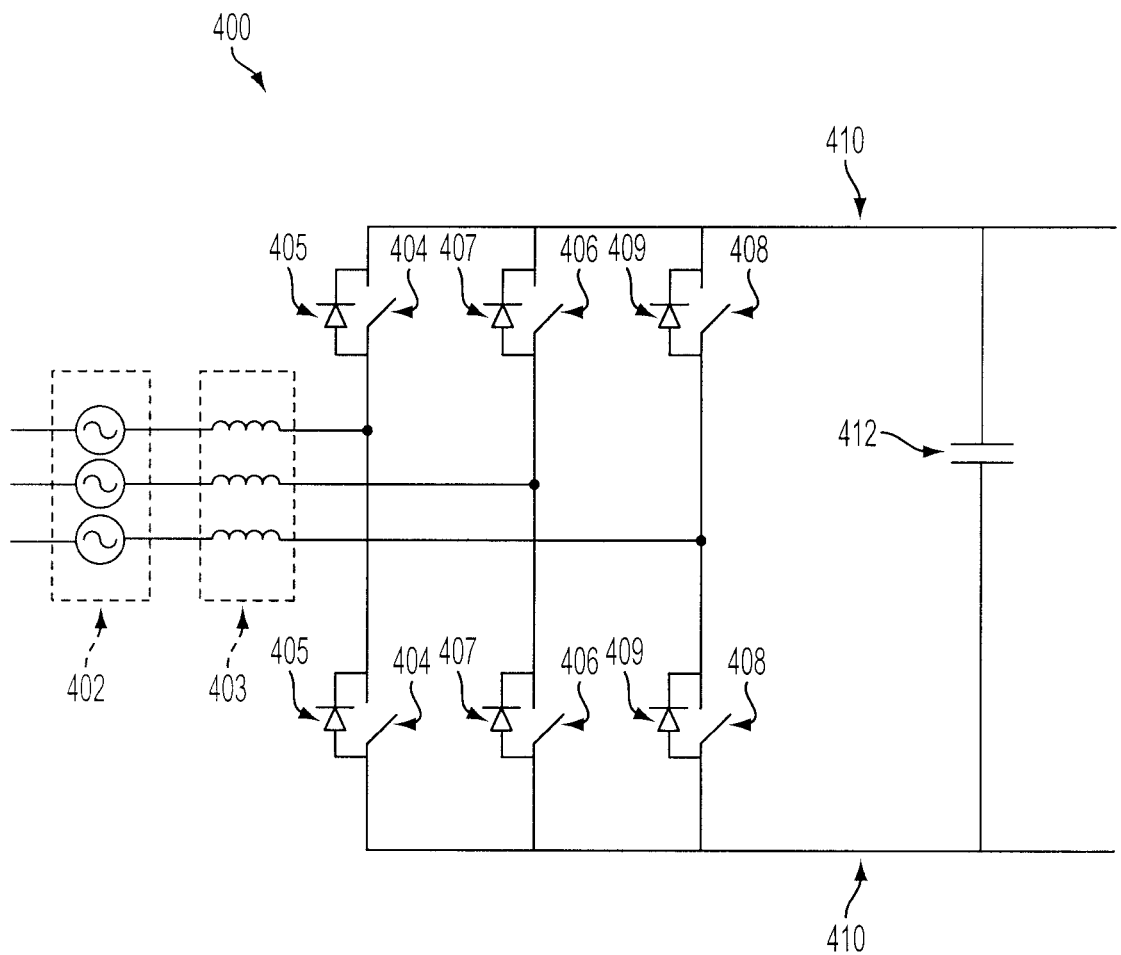
FIG. 4 is a schematic illustrating a conventional arrangement of transistors.
Figure 6:
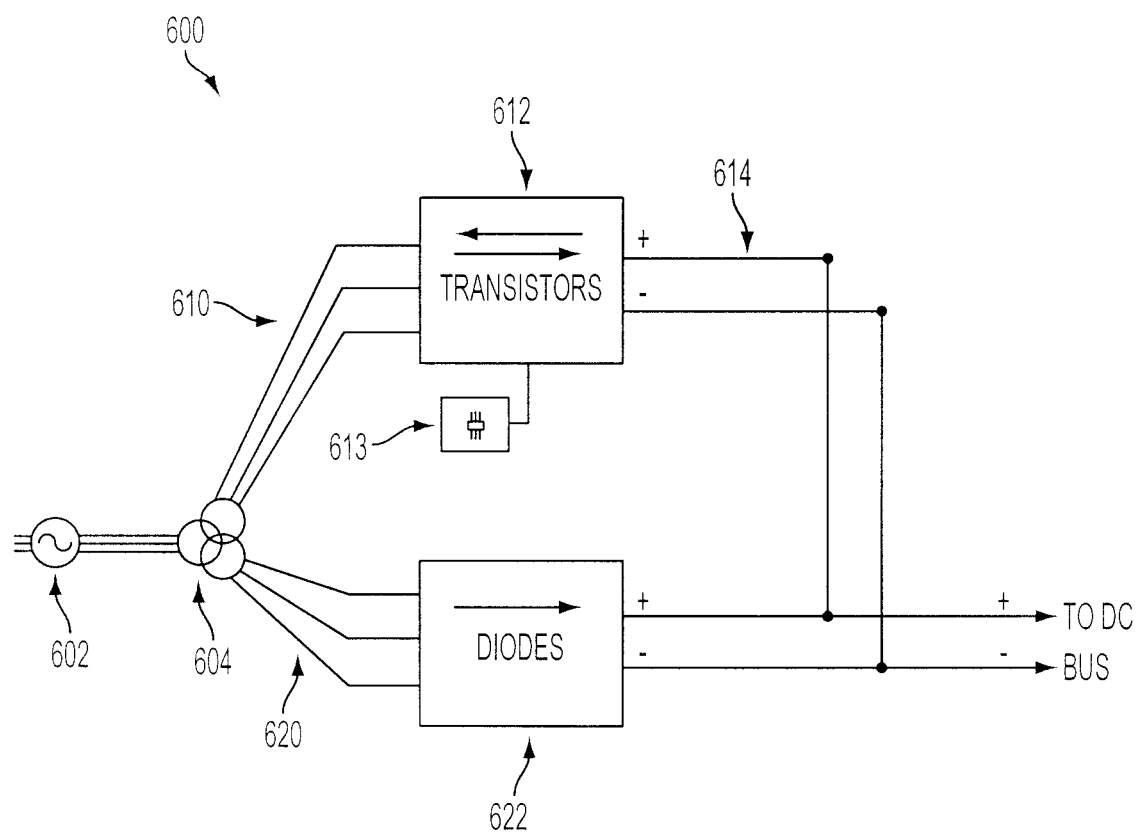
FIG. 6 is a schematic illustrating an exemplary DC bus regulator using a transistor pack and a diode pack according to one embodiment of the invention.

FIG. 6 is a schematic illustrating an exemplary DC bus regulator utilizes transistor packs and diode packs according to one embodiment of the invention. Regulator 600 may be used to implement the operational graph shown in FIG. 5. Regulator 600 accepts input from three-phase AC source 602 conditioned by transformer 604. A typical value for AC source 602 in one application may be 11 kV. Transformer 604 outputs voltage onto line 610 and line 620. A typical value for lines 610 and 620 is 600 V, but they need not be equal. Transistor pack 612 may be coupled to line 610 and DC bus 614. Transistor pack 612 may be implemented, at least partially, using transistor pack 400 in FIG. 4. Diode pack 622 may be coupled to line 610 and DC bus 614. Diode pack 622 may be implemented, at least partially, using diode rectifier 200 in FIG. 2. Microcontroller 613 is operatively connected to transistor pack 612 to control the current flow through and output voltage of transistor pack 612. Microcontroller 613 may be any control system capable of controlling transistor pack 612 such as, for example, a programmable microprocessor, a digital signal processor ("DSP"), field programmable gate array ("FPGA"), application specific integrated circuit ("ASIC"), or any other logical device. Microcontroller 613 may be integrated with transistor pack 612 or may be separate. In another embodiment, transistor pack 612 may independently monitor the voltage of DC bus 614 and regulate current flow through transistor pack 612. In yet another embodiment, loads connected to regulator 600 may be configured to provide input to microcontroller 613 about future power demands.

Turning to FIG. 5, in region of operation 511, a substantial portion of the total energy passing through regulator 600 will pass through transistor pack 612. In a preferred embodiment, this is accomplished by microcontroller 613 controlling transistor pack 612 such that the voltage on DC bus 614 is at a level below the voltage on line 620, causing the diodes to not conduct. Microcontroller 613 may control the system such that all current flows through transistor pack 612 or simply such that a substantial portion flows through transistor pack 612 and a smaller portion flows through diode pack 622.

When the power load increases such that region of operation 512 is entered, additional energy will flow through diode pack 622. This may be accomplished in a preferred embodiment by microcontroller 613 configuring transistor pack 612 to modify the voltage on DC bus 614 to enable conduction through diode pack 622. When operation re-enters region 511, microcontroller 613 configures transistor pack 612 to modify the voltage on DC bus 614 to disable or substantially reduce conduction through diode pack 622. When operating in region 512, power conduction through transistor pack 612 may, in some embodiments, be significantly reduced or terminated. As discussed in detail below, this may allow transistor pack 612 or some portion thereof to be used in other operations around the distribution network. It should be noted that the border between regions 511 and 512 need not be the absolute capacity of the available transistors. Rather, the border may be an appropriate value taking into account the available resources of regulator 600 and the operating characteristics of the system.

Another embodiment of a system that converts AC-to-DC power combines transistor packs and SCR packs. Advantages of this design are the fast response time of the transistors and the high capacity, low cost, and controllable current of the SCRs. SCRs operate in the simplest case identical to diodes but have the added feature of current control through gate timing.

Figure 3:
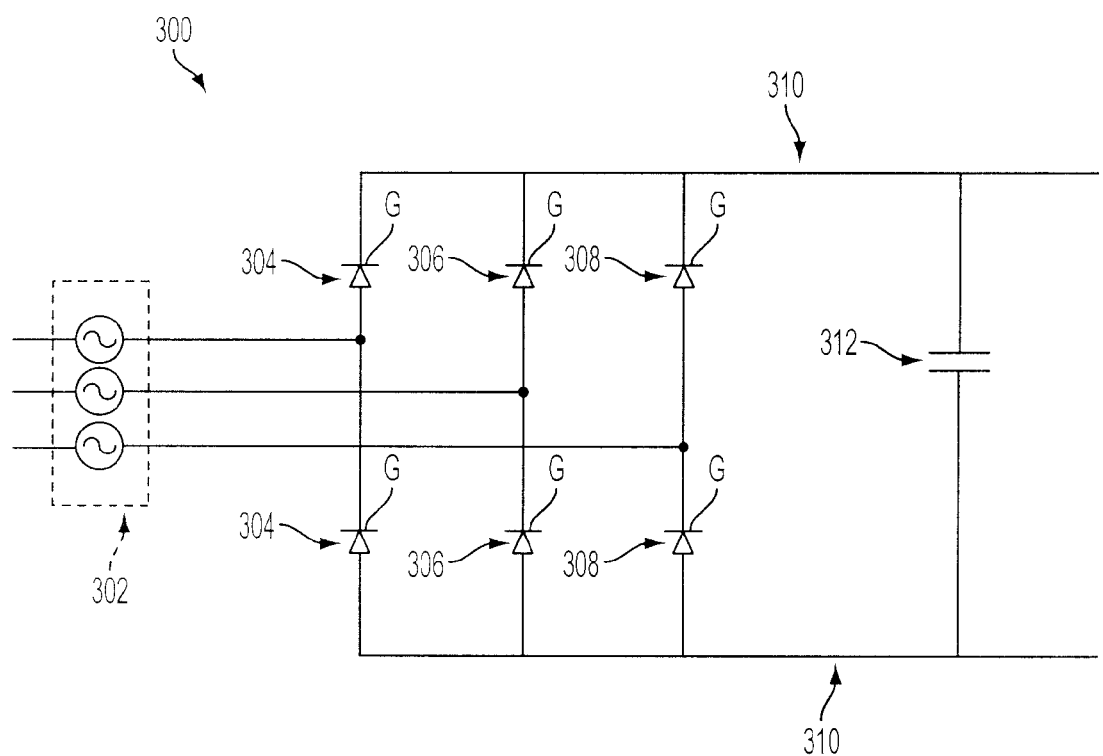
FIG. 3 is a schematic illustrating a conventional arrangement of SCRs for AC-to-DC conversion.
Figure 7:
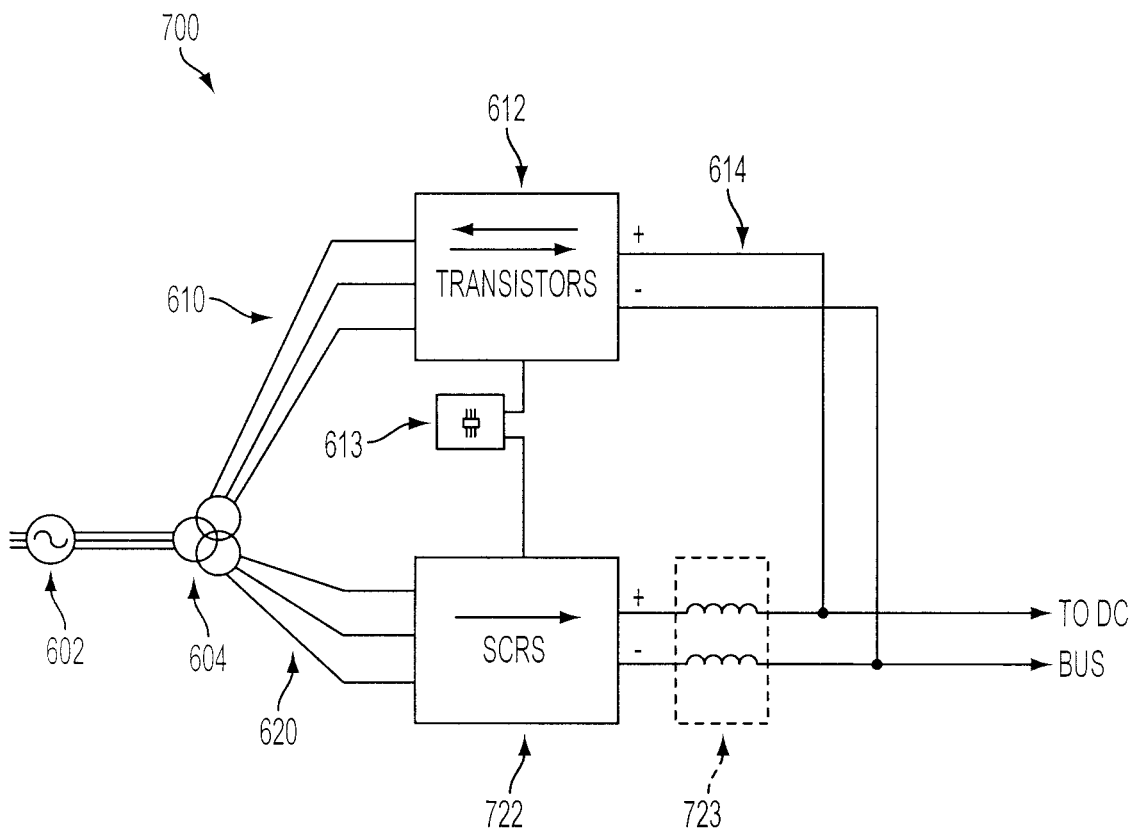
FIG. 7 is a schematic illustrating an exemplary DC bus regulator using a transistor pack and a SCR pack according to one embodiment of the invention.

FIG. 7 is a schematic illustrating an exemplary DC bus regulator using a transistor pack and an SCR pack according to one embodiment of the invention. Regulator 700 may, for example, implement the system illustrated in FIG. 5. Transistor pack 612 is coupled to line 610 to DC bus 614, similar to regulator 600. SCR pack 722 may be coupled to line 620, after conditioning by inductors 723, and to DC bus 614, similar to the placement of diode pack 622 in FIG. 6. SCR pack 722 may be implemented, at least partially, using SCR pack 300 in FIG. 3. In region of operation 511, a substantial portion of the total energy passing through regulator 700 will pass through transistor pack 612. In a preferred embodiment, microcontroller 613 may control power flow through transistor pack 612 in order to regulate the voltage on DC bus 614. In one embodiment, microcontroller 613 also couples to SCR pack 722. Microcontroller 613 may control the gates of the SCRs in SCR pack 722 to enable power flow through SCR pack 722. Alternatively, the microcontroller 613 may control a second microcontroller (not illustrated) that controls the SCRs.

Another embodiment of a system that converts AC to DC power combines transistors with diodes or SCRs and resistors. Diodes and SCRs as shown in FIG. 6 and FIG. 7 may be used to augment the capacity of transistors when the forward power exceeds the transistor's capacity. However, diodes and SCRs only conduct in one direction preventing them from allowing reverse power flow. In operating region 522, resistors, batteries, capacitors, or other storage devices may be added to remove power from DC bus.

Figure 8:
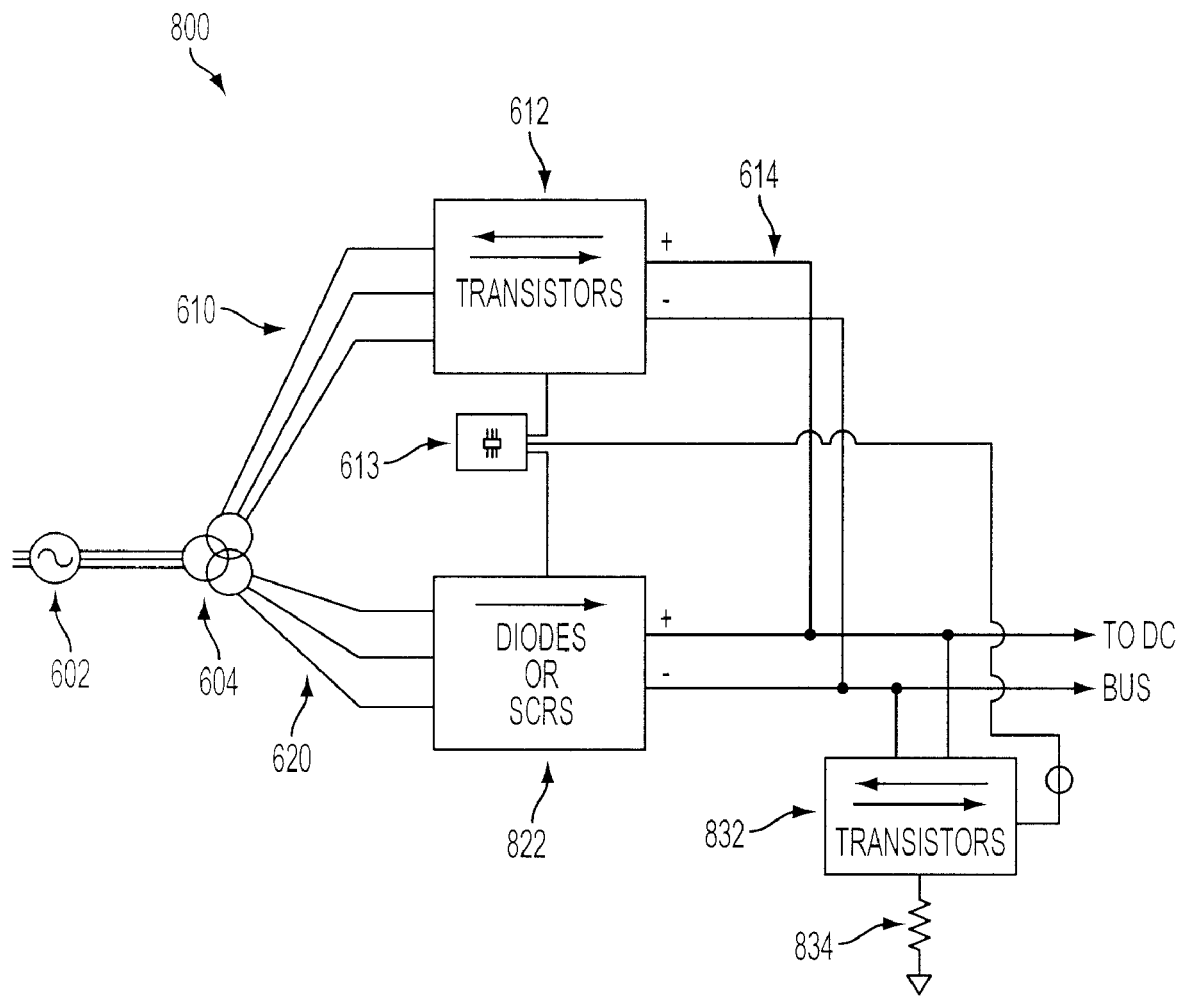
FIG. 8 is a schematic illustrating an exemplary DC bus regulator using a resistor according to one embodiment of the invention.

FIG. 8 is a schematic illustrating an exemplary DC bus regulator using resistors according to one embodiment of the invention. Regulator 800 accepts input from AC source 602 after conditioning by transformer 604 into line 610 and line 620. Transistor pack 612 couples line 610 to DC bus 614 and diode pack 822 couples line 620 to DC bus 614. An SCR pack could be used in place of diode pack 822 to achieve similar results, as illustrated in FIG. 7. Additionally, transistor pack 832 couples resistors 834 to DC bus 614. Transistor pack 832 may be comprised of transistors which may be similar to the transistors used in transistor pack 612, or may be any other switching component with the necessary operational characteristics. Transistor pack 832 may be controlled by microcontroller 613 to enable or disable resistors 834. In reverse power operation region 521 as illustrated in FIG. 5, power may flow through transistor pack 612 back to AC source 602. When the power capacity of transistor pack 612 is reached, microcontroller 613 may enable transistor pack 832 allowing power to flow to resistors 834 and dissipate as heat. When operation returns to region 521, microcontroller 613 may turn off transistor pack 832 and power flow occurs only through transistor pack 612. As discussed above, the border between regions 521 and 522 need not be the absolute capacity of the available transistors. Rather, the border may be an appropriate value taking into account the available resources of regulator 800 and the operating characteristics of the system.

Although resistors provide power consumption when power needs to be taken off the DC bus, the power is lost in heat dissipation. Since generators consume resources to generate the energy taken off the DC bus, it would be preferable to store the energy in such a means that the energy may be put back on the DC bus at a later time. Such a configuration would increase efficiency and reduce the cost of operating the generators for the power system. Additionally, stored energy may respond more dynamically to changes in power loads. Sudden increases in power demand are difficult to accommodate with AC generators due to the length of response time required to increase fuel consumption to generate the needed power. Furthermore, autonomy from the generators is obtained, because a sudden failure of the AC generators may be compensated by the stored power.

Figure 9:
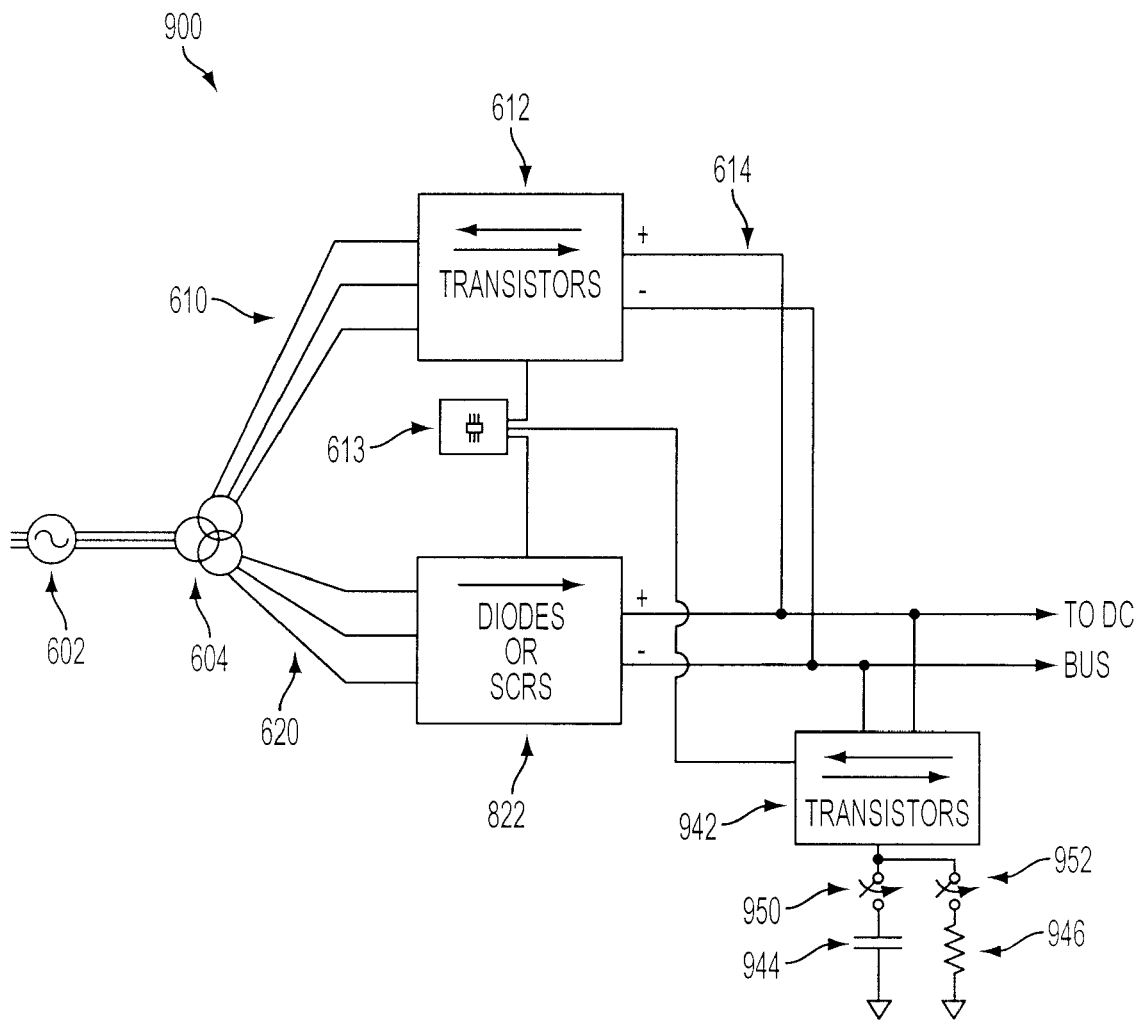
FIG. 9 is a schematic illustrating an exemplary DC bus regulator using a resistor and capacitor according to one embodiment of the invention.

FIG. 9 is a schematic illustrating an exemplary DC bus regulator using a resistor and capacitor for reverse power regulation according to one embodiment of the invention. Regulator 900 accepts input from AC source 602 after conditioning by transformer 604 into line 610 and line 620. Transistor pack 612 couples line 610 to DC bus 614 and diode pack 822 couples line 620 to DC bus 614. An SCR pack could be used in place of diode pack 822 to achieve similar results. Additionally, switch 942 couples capacitors 944 and resistors 946 to DC bus 614. Switch 942 may be controlled by microcontroller 613 to enable or disable capacitors 944. Additionally, switch 950 and switch 952 coupled to capacitors 944 and resistors 946, respectively, allow energy to be stored in capacitors 944 or dissipated through resistors 946. In reverse power operation region 521 power may flow through transistor pack 612 back to AC source 602. When the power capacity of transistor pack 612 is reached, microcontroller 613 may enable 942 allowing power to flow to capacitors 944. When operation returns to region 521, microcontroller 613 may turn off switch 942 and power flow occurs only through transistor pack 612. Regulator 900 may also use a combination of resistors and capacitors in place of capacitors 944. Further, any other energy dissipation or energy storage technology may be used in combination or as a substitution for capacitors 944 such as rotating masses or batteries.

Although the present disclosure has described in detail using three-phase AC sources, one skilled in the art may readily modify the disclosure in this application to operate on a two phase or other AC system, or from DC generators.

Figure 1:
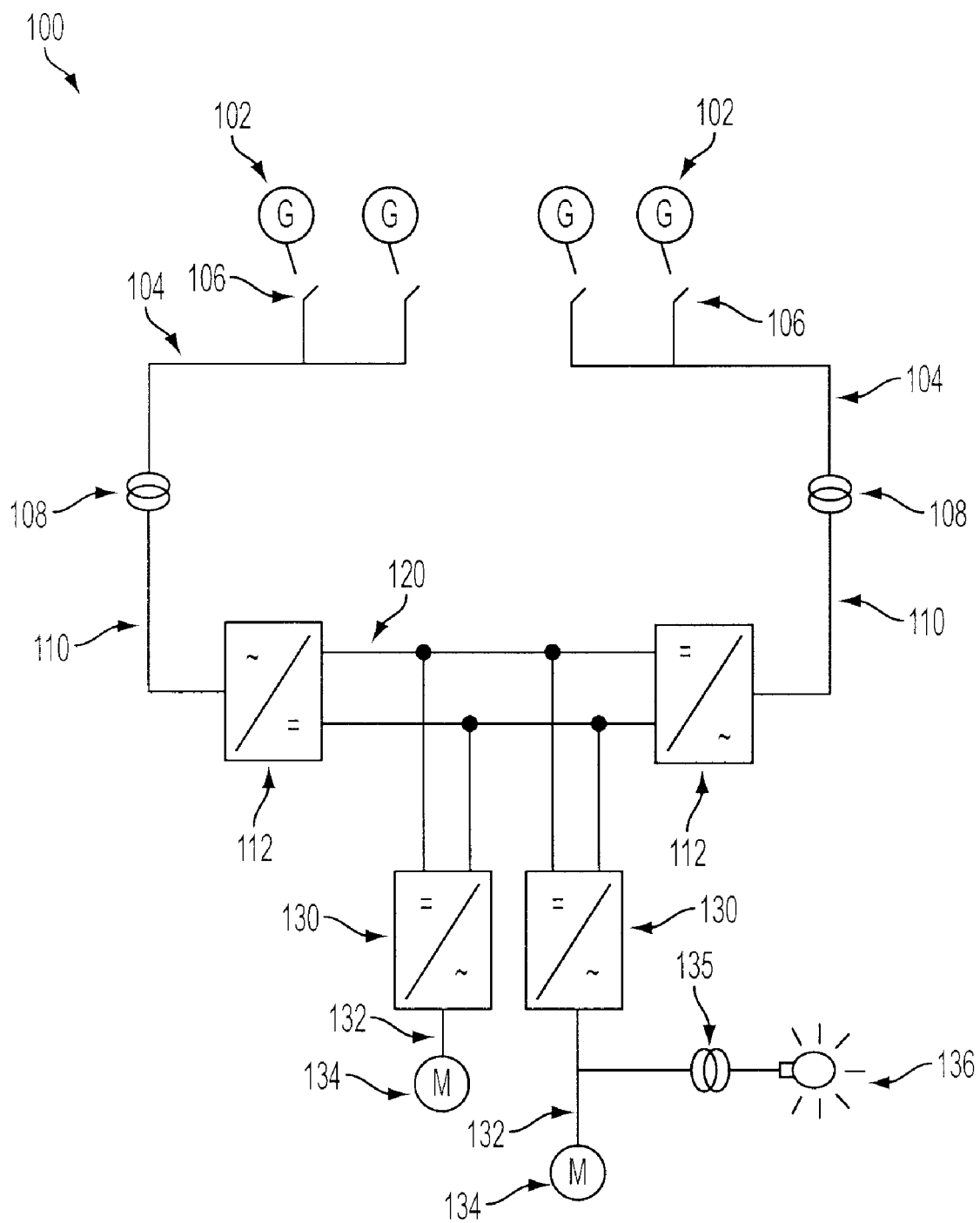
FIG. 1 is a block diagram illustrating a conventional DC voltage bus coupling multiple AC voltage generation systems to various loads.

In the design of FIG. 1 multiple AC-to-DC converters are required as are multiple DC-to-AC converters and DC-to-DC converters. For example, motor 134 may operate on AC power and therefore it is necessary to convert the power on the DC bus back to AC before it may be utilized by motor 134. One skilled in the art will recognize that DC-to-AC power conversion may be accomplished using similar components as are used for AC-to-DC power conversion. For example, transistor pack 612 as shown in FIG. 6, FIG. 7, FIG. 8, and FIG. 9 may be configured to perform DC-to-AC conversion.

Also, DC-to-DC power conversion may be accomplished using similar components as DC-to-AC and AC-to-DC power conversion.

In the different regions of operation exemplarily shown in FIG. 5, as power flow is diverted from transistors to diodes or SCRs, at least a portion of the transistor pack no longer in use may be switched from converting AC-to-DC power for the DC bus to convert DC-to-AC power for an attached load, energy storage device, or resistor. Such a configuration may reduce the number of transistors required for the power system illustrated in FIG. 1 thereby reducing the space requirements and the cost of the overall power system.

Figure 10:
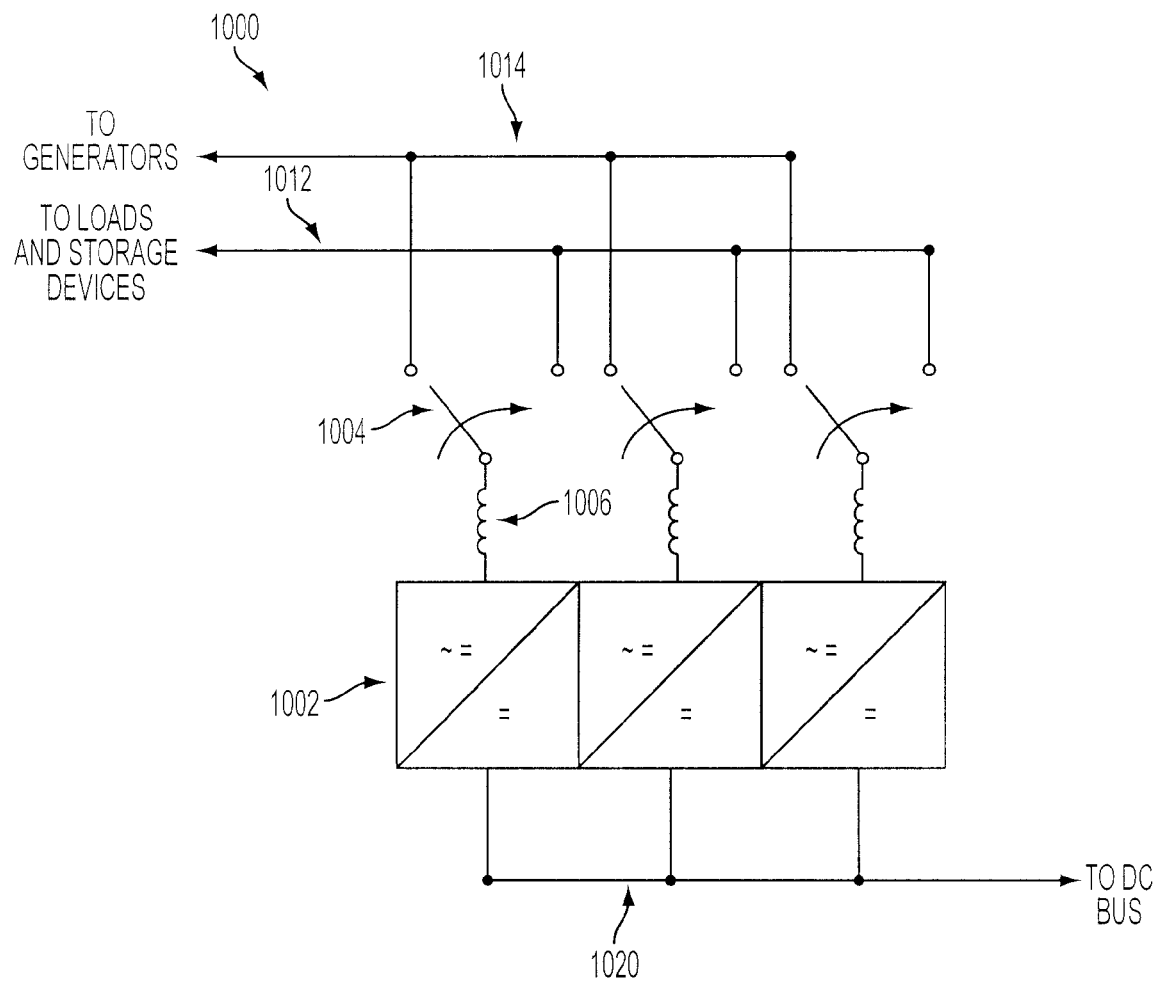
FIG. 10 is a block diagram illustrating a swing pack for AC-to-DC, DC-to-AC, and DC-to-DC conversion according to one embodiment of the invention.

FIG. 10 is a block diagram illustrating a swing pack for AC-to-DC, DC-to-AC, and DC-to-DC conversion according to one embodiment of the invention. Power system 1000 includes bank of converters 1002. Bank of converters 1002 may be any number or combination of devices capable of AC-to-DC, DC-to-AC, and DC-to-DC conversion, such as transistor pack 400 illustrated in FIG. 4. Bank of converters 1002 are coupled on one side to DC bus 1020 and on another side to isolators 1004. Isolators 1004 when closed couple one converter of bank 1002 to line 1014 leading to AC or DC generators or to line 1012 leading to AC or DC loads. The isolators may be controlled, for example, by a microcontroller or other control system that may be separate or the same as microcontroller 613. Inductor 1006 conditions power before reaching line 1012 or line 1014. The selection of which power consumption units are engaged in generator to DC bus power transfer or DC bus to load may be based on the process at hand. For example, use of on power pack of bank 1002 to pass power to an energy storage device would be done when the DC bus had excess power and therefore the power pack would not need to be engaged in moving power from the generator to the DC bus.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus for interfacing an AC bus and DC bus, comprising:
   a set of one or more transistors coupled to the AC bus and coupled to the DC bus;
   a set of one or more diodes coupled to the AC bus and coupled to the DC bus; and
   a microcontroller coupled to the set of one or more transistors configured to regulate the current flow through the set of one or more transistors and to regulate the current flow through the set of one or more diodes.

2. The apparatus of claim 1, in which the microcontroller is configured to regulate current through the set of one or more diodes by regulating the voltage on the DC bus.

3. The apparatus of claim 1, in which the microcontroller is configured to regulate current flow through the set of one or more transistors and the set of one or more diodes such that substantially all power flows through the set of one or more transistors when the power load of the DC bus is within a first power range.

4. The apparatus of claim 3, in which the set of one or more transistors have a first total power capacity and the set of one or more diodes have a second total power capacity, where the first total power capacity is less than the second total power capacity, and which the first power range is between zero and a first level that is selected, in part, based on the first total power capacity.

5. The apparatus of claim 1, further comprising:
a set of one or more power consuming or storing devices; and
a switch coupled to the DC bus and to the set of one or more power consuming devices,
in which the microcontroller is further configured to regulate power transfer to the set of one or more power consuming or storing devices.

6. The apparatus of claim 5, in which the set of one or more power consuming devices includes resistors.

7. The apparatus of claim 5, in which the set of one or more power consuming devices includes capacitors.

8. The apparatus of claim 1, in which the set of one or more transistors includes one or more transistor packs, each transistor pack configured to operate as a separate unit, the apparatus further comprising:
a switch arranged between the AC bus and one of the transistor packs such that the transistor pack is not directly coupled to the AC bus, the switch coupled to the AC bus, an AC load device, and the transistor pack, in which the switch is configured to alternatively couple the transistor pack to the AC bus or the AC load device;
in which the transistor pack is configured to perform AC to DC power conversion when coupled to the AC bus and the DC bus and to perform DC to AC power conversion when coupled to the DC bus and the AC load device.

9. An apparatus for interfacing an AC bus and DC bus, comprising:
a set of one or more transistors coupled to the AC bus and coupled to the DC bus;
a set of one or more SCRs coupled to the AC bus and coupled to the DC bus; and
a first microcontroller coupled to the set of one or more transistors configured to regulate the current flow through the set of one or more transistors and to regulate the current flow through the set of one or more SCRs.

10. The apparatus of claim 9, in which the first microcontroller is configured to regulate current through the set of one or more SCRs by regulating the voltage on the DC bus.

11. The apparatus of claim 10, in which the first microcontroller further regulates current through the set of one or more SCRs by controlling the gates of the SCRs.

12. The apparatus of claim 11, further comprising:
a second microcontroller coupled to the one or more SCRs;
in which the first microcontroller regulates current through the set of one or more SCRs by signaling the second microcontroller.

13. The apparatus of claim 9, in which the microcontroller is configured to regulate current flow through the set of one or more transistors and the set of one or more SCRs such that substantially all power flows through the set of one or more transistors when the power load of the DC bus is within a first power range.

14. The apparatus of claim 9, in which the set of one or more transistors have a first total power capacity and the set of one or more SCRs have a second total power capacity, where the first total power capacity is less than the second total power capacity, and which the first power range is between zero and a level that is selected, in part, based on the first total power capacity.

15. The apparatus of claim 9, further comprising:
a set of one or more power consuming devices; and
a switch coupled to the DC bus and to the set of one or more power consuming devices,
in which the first microcontroller is further configured to regulate power transfer to the set of one or more power consuming devices.

16. The apparatus of claim 15, in which the set of one or more power consuming devices includes resistors.

17. The apparatus of claim 15, in which the set of one or more power consuming devices includes capacitors.

18. A method for interfacing an AC bus coupled to a set of one or more generators with a DC bus, comprising:
coupling a set of one or more transistors having a first total power capacity to the AC bus and to the DC bus;
coupling a set of one or more diodes having a second total power capacity to the AC bus and to the DC bus; and
regulating current flow through the set of one or more transistors and the set of one or more diodes such that substantially all power flows through the set of one or more transistors when the power load of the DC bus is within a first power range.

19. The method of claim 18, in which the first total power capacity is substantially less than the total power capacity of the set of one or more generators.

20. The method of claim 18, in which the first power range is selected, at least in part, to correspond to the power range in which the overall system, which includes the one or more generators, the AC bus, and the DC bus, is known to be less stable.

21. The method of claim 20, in which the first power range is between zero and a first level.

22. The method of claim 21, in which the first level is chosen, in part, based on the first total power capacity.

23. The method of claim 21, in which the first level is chosen, in part, based on the capacity of the one or more generators.

24. The method of claim 18, in which the regulating current flow step includes regulating voltage on the DC bus.

25. The method of claim 18, further comprising:
coupling, through a switch, the DC bus to a set of one or more power consuming or storing devices;
regulating current flow through the set of one or more power consuming or storing devices when the power load of the DC bus is above a second level.

26. The method of claim 25, in which the second level is chosen, in part, based on the first total power capacity.

27. An apparatus for AC to DC and DC to AC power conversion, comprising:
a set of one or more transistor packs, each transistor pack configured to operate as a separate unit coupled to an AC bus and a DC bus
a switch arranged between the AC bus and one of the transistor packs such that the transistor pack is not directly coupled to the AC bus, the switch coupled to the AC bus, an AC load device, and the transistor pack, in which the switch is configured to alternatively couple the transistor pack to the AC bus or the AC load device;
in which the transistor pack is configured to perform AC to DC power conversion when coupled to the AC bus and the DC bus and to perform DC to AC power conversion when coupled to the DC bus and the AC load device.

28. The apparatus of claim 27 further comprising:
a second switch arranged between the AC bus and a second one of the transistor packs such that the second transistor pack is not directly coupled to the AC bus, the switch coupled to the AC bus, an AC load device, and the second transistor pack, in which the switch is configured to alternatively couple the second transistor pack to the AC bus or the AC load device;
in which the second transistor pack is configured to perform AC to DC power conversion when coupled to the AC bus and the DC bus and to perform DC to AC power conversion when coupled to the DC bus and the AC load device.

29. An apparatus for interfacing an AC bus and DC bus, comprising:
a set of one or more transistors coupled to the AC bus and coupled to the DC bus;
a set of one or more SCRs coupled to the AC bus and coupled to the DC bus; and
a microcontroller coupled to the set of one or more transistors configured to regulate the current flow through the set of one or more transistors and to regulate the current flow through the set of one or more SCRs.

30. The apparatus of claim 29, in which the microcontroller is configured to regulate current through the set of one or more SCRs by regulating the voltage on the DC bus.

31. The apparatus of claim 29, in which the microcontroller is configured to regulate current flow through the set of one or more transistors and the set of one or more SCRs such that substantially all power flows through the set of one or more transistors when the power load of the DC bus is within a first power range.

32. The apparatus of claim 31, in which the set of one or more transistors have a first total power capacity and the set of one or more SCRs have a second total power capacity, where the first total power capacity is less than the second total power capacity, and which the first power range is between zero and a first level that is chosen, in part, based on the first total power capacity.

33. The apparatus of claim 29, further comprising:
a set of one or more power consuming or storing devices; and
a switch coupled to the DC bus and to the set of one or more power consuming devices,
in which the microcontroller is further configured to regulate power transfer to the set of one or more power consuming or storing devices.

34. The apparatus of claim 33, in which the set of one or more power consuming devices includes resistors.

35. The apparatus of claim 33, in which the set of one or more power consuming devices includes capacitors.

36. The apparatus of claim 29, in which the set of one or more transistors includes one or more transistor packs, each transistor pack configured to operate as a separate unit, the apparatus further comprising:
a switch arranged between the AC bus and one of the transistor packs such that the transistor pack is not directly coupled to the AC bus, the switch coupled to the AC bus, an AC load device, and the transistor pack, in which the switch is configured to alternatively couple the transistor pack to the AC bus or the AC load device;
in which the transistor pack is configured to perform AC to DC power conversion when coupled to the AC bus and the DC bus and to perform DC to AC power conversion when coupled to the DC bus and the AC load device.

37. An apparatus for interfacing an AC bus and DC bus, comprising:
a set of one or more transistors coupled to the AC bus and coupled to the DC bus;
a set of one or more SCRs coupled to the AC bus and coupled to the DC bus; and
a first microcontroller coupled to the set of one or more transistors configured to regulate the current flow through the set of one or more transistors and to regulate the current flow through the set of one or more SCRs.

38. The apparatus of claim 37, in which the first microcontroller is configured to regulate current through the set of one or more SCRs by regulating the voltage on the DC bus.

39. The apparatus of claim 38, in which the first microcontroller further regulates current through the set of one or more SCRs by controlling the gates of the SCRs.

40. The apparatus of claim 39, further comprising:
a second microcontroller coupled to the one or more SCRs;
in which the first microcontroller regulates current through the set of one or more SCRs by signaling the second microcontroller.

41. The apparatus of claim 37, in which the microcontroller is configured to regulate current flow through the set of one or more transistors and the set of one or more SCRs such that substantially all power flows through the set of one or more transistors when the power load of the DC bus is within a first power range.

42. The apparatus of claim 37, in which the set of one or more transistors have a first total power capacity and the set of one or more SCRs have a second total power capacity, where the first total power capacity is less than the second total power capacity, and which the first power range is between zero and a first level that is chosen, in part, based on the first total power capacity.

43. The apparatus of claim 37, further comprising:
a set of one or more power consuming devices; and
a switch coupled to the DC bus and to the set of one or more power consuming devices,
in which the first microcontroller is further configured to regulate power transfer to the set of one or more power consuming devices.

44. The apparatus of claim 43, in which the set of one or more power consuming devices includes resistors.

45. The apparatus of claim 43, in which the set of one or more power consuming devices includes capacitors.

46. A method for interfacing an AC bus coupled to a set of one or more generators with a DC bus, comprising:
coupling a set of one or more transistors having a first total power capacity to the AC bus and to the DC bus;
coupling a set of one or more SCRs having a second total power capacity to the AC bus and to the DC bus; and
regulating current flow through the set of one or more transistors and the set of one or more SCRs such that substantially all power flows through the set of one or more transistors when the power load of the DC bus is within a first power range.

47. The method of claim 46, in which the first total power capacity is substantially less than the total power capacity of the set of one or more generators.

48. The method of claim 46, in which the first power range is selected, at least in part, to correspond to the power range in which the overall system, which includes the one or more generators, the AC bus, and the DC bus, is known to be less stable.

49. The method of claim 48, in which the first power range is between zero and a first level.

50. The method of claim 49, in which the first level is chosen, in part, based on the first total power capacity.

51. The method of claim 50, in which the first level is chosen, in part, based on the capacity of the one or more generators.

52. The method of claim 46, in which the regulating current flow step includes regulating voltage on the DC bus.

53. The method of claim 46, further comprising:
coupling, through a switch, the DC bus to a set of one or more power consuming or storing devices;
regulating current flow through the set of one or more power consuming or storing devices when the power load of the DC bus is above a second level.

54. The method of claim 53, in which the second level is chosen, in part, based on the first total power capacity.

55. An apparatus for AC to DC and DC to AC power conversion, comprising:
a set of one or more transistor packs, each transistor pack configured to operate as a separate unit coupled to an AC bus and a DC bus
a switch arranged between the AC bus and one of the transistor packs such that the transistor pack is not directly coupled to the AC bus, the switch coupled to the AC bus, an AC load device, and the transistor pack, in which the switch is configured to alternatively couple the transistor pack to the AC bus or the AC load device;
in which the transistor pack is configured to perform AC to DC power conversion when coupled to the AC bus and the DC bus and to perform DC to AC power conversion when coupled to the DC bus and the AC load device.

56. The apparatus of claim 55 further comprising:
a second switch arranged between the AC bus and a second one of the transistor packs such that the second transistor pack is not directly coupled to the AC bus, the switch coupled to the AC bus, an AC load device, and the second transistor pack, in which the switch is configured to alternatively couple the second transistor pack to the AC bus or the AC load device;
in which the second transistor pack is configured to perform AC to DC power conversion when coupled to the AC bus and the DC bus and to perform DC to AC power conversion when coupled to the DC bus and the AC load device.

57. An apparatus for use in with an AC generator, an AC load, and a DC bus, comprising:
a transistor pack configured to perform AC-to-DC power conversion and DC-to-AC power conversion, the transistor pack including at least a first input and a second input;
a first switch coupled to the AC generator, the AC load, the DC bus, and the first input of the transistor pack, the first switch arranged to connect the first input of the transistor pack to the AC generator, the AC load, or the DC bus;
a second switch coupled to the AC generator, the AC load, the DC bus, and the second input of the transistor pack, the second switch arranged to connect the second input of the transistor pack to the AC generator, the AC load, or the DC bus; and
a microcontroller configured to, in a first instance, instruct the first switch and the second switch to connect the first and second inputs of the transistor pack so that the transistor pack may convert AC power from the AC generator to DC power for the DC bus and to, in a second instance, instruct the first switch and the second switch to connect the first and second inputs of the transistor pack so that the transistor pack may convert DC power from the DC bus to AC power for the AC load.

58. The apparatus of claim 57, in which the microcontroller is configured to instruct the first switch to connect the first input of the transistor pack to the AC generator and instruct the second switch to connect the second input of the transistor pack to the DC bus so that the transistor pack may convert AC power from the AC generator to DC power for the DC bus, and is further configured to instruct the first switch to connect the first input of the transistor pack to the DC bus and instruct the second switch to connect the second input of the transistor pack to the AC load so that the transistor pack may convert DC power from the DC bus to AC power for the AC load.

59. A method for using a transistor pack capable of performing AC-to-DC, DC-to-AC, or DC-to-DC conversion in conjunction with a generator, a load, and a DC bus, comprising:
coupling the transistor pack to the generator and the DC bus such that the transistor pack may perform AC-to-DC conversion or DC-to-DC conversion; and
coupling the transistor pack to the DC bus and the load such that the transistor pack may perform DC-to-AC or DC-to-DC conversion.

* * * * *

(12) EX PARTE REEXAMINATION CERTIFICATE (9165th)
United States Patent
Bourgeau

(10) Number: US 7,880,342 C1
(45) Certificate Issued: Jul. 31, 2012

(54) DC BUS REGULATOR

(75) Inventor: Edward P. Bourgeau, Houston, TX (US)

(73) Assignee: Transocean Sedco Forex Ventures Limited, Houston, TX (US)

Reexamination Request:
No. 90/012,012, Nov. 17, 2011

Reexamination Certificate for:
Patent No.: 7,880,342
Issued: Feb. 1, 2011
Appl. No.: 12/269,703
Filed: Nov. 12, 2008

(51) Int. Cl.
*G05F 3/06* (2006.01)

(52) U.S. Cl. .................................................. 307/151
(58) Field of Classification Search .................. None
See application file for complete search history.

(56) References Cited

To view the complete listing of prior art documents cited during the proceeding for Reexamination Control Number 90/012,012, please refer to the USPTO's public Patent Application Information Retrieval (PAIR) system under the Display References tab.

*Primary Examiner* — My-Trang Nu Ton

(57) ABSTRACT

An improved DC bus regulator that utilizes more transistor packs for power conversion at some times and diode, SCR, and resistor packs at other times. The conversion technology is selected by the regulator based on the current load capacity and response required. For example, transistor packs may be used in low power load conditons. Through use of this hybrid system, the system obtains the desirable effects of transistor pack systems including fast response time, ability to regulate current, and bi-directional power conversion while mitigating the high costs and fragile nature of a system based solely on transistor packs.

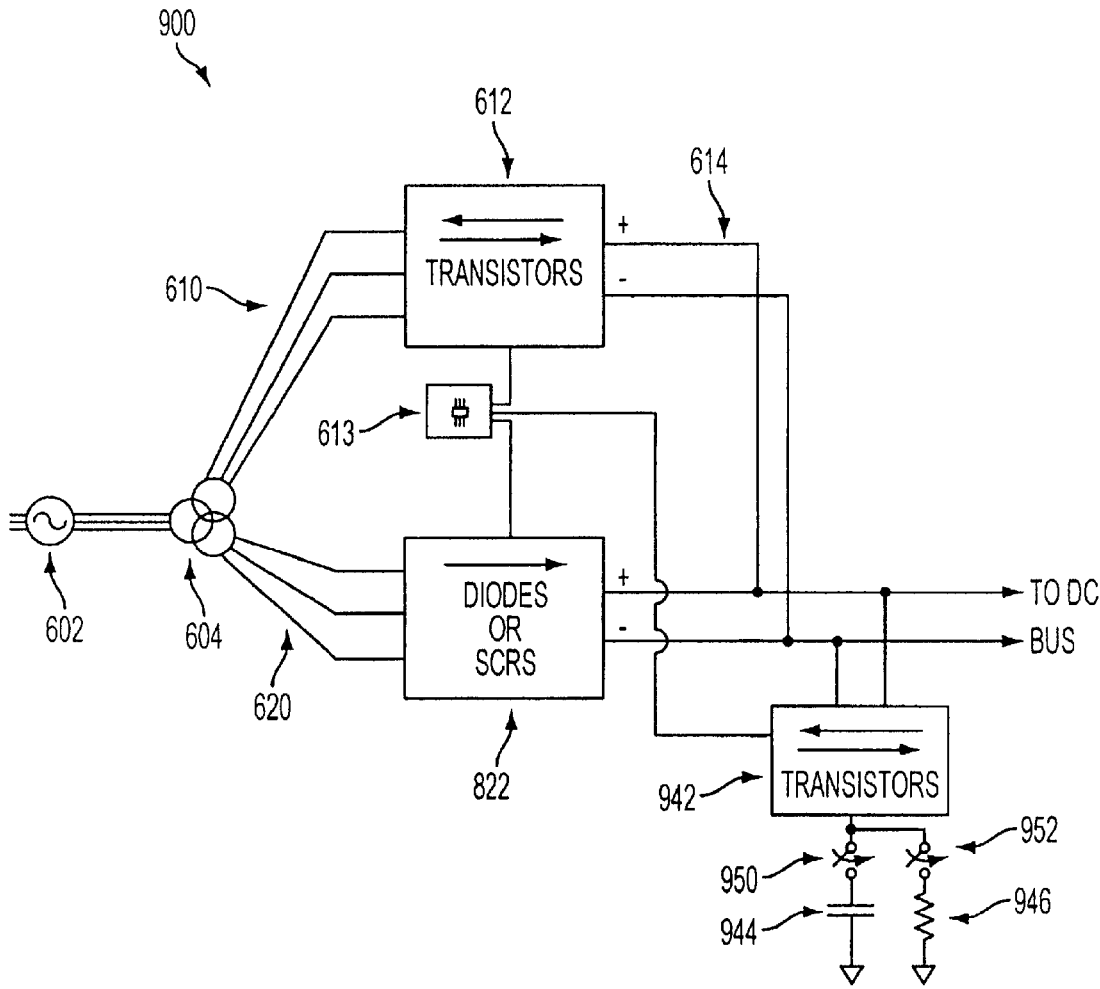

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 27-28 and 57-58 is confirmed.

Claim 59 is cancelled.

Claims 1, 9, 18, 29, 37, 46 and 55 are determined to be patentable as amended.

Claims 2-8, 10-17, 24-25, 30-36, 38-45, 52-53 and 56, dependent on an amended claim, are determined to be patentable.

Claims 19-23, 26, 47-51 and 54 were not reexamined.

1. An apparatus for interfacing an AC bus and DC bus, comprising:
- *a transformer coupled to the AC bus having at least a first output and a second output;*
- a set of one or more transistors coupled to the [AC bus] *first output of the transformer* and coupled to the DC bus;
- a set of one or more diodes, *separate from the set of one or more transistors,* coupled to the [AC bus] *second output* and coupled to the DC bus; and
- a microcontroller coupled to the set of one or more transistors configured to regulate the current flow through the set of one or more transistors and to regulate the current flow through the set of one or more diodes.

9. An apparatus for interfacing an AC bus and DC bus, comprising:
- *a transformer coupled to the AC bus having at least a first output and a second output;*
- a set of one or more transistors coupled to the [AC bus] *first output* and coupled to the DC bus;
- a set of one or more SCRs, *separate from the set of one or more transistors,* coupled to the [AC bus] *second output* and coupled to the DC bus; and
- a first microcontroller coupled to the set of one or more transistors configured to regulate the current flow through the set of one or more transistors and to regulate the current flow through the set of one or more SCRs.

18. A method for interfacing *a DC bus with a transformer coupled to* an AC bus [coupled to] *having* a set of one or more generators [with a DC bus], comprising:
- coupling a set of one or more transistors having a first total power capacity to [the AC bus] *a first output of the transformer* and to the DC bus;
- coupling a set of one or more diodes, *separately from the set of one or more transistors,* having a second total power capacity to [the AC bus] *a second output of the transformer* and to the DC bus; and
- regulating current flow though the set of one or more transistors and the set of one or more diodes such that substantially all power flows through the set of one or more transistors when the power load of the DC bus is within a first power range.

29. An apparatus for interfacing an AC bus and DC bus, comprising:
- *a transformer coupled to the AC bus having at least a first output and a second output;*
- a set of one or more transistors coupled to the [AC bus] *first output of the transformer* and coupled to the DC bus;
- a set of one or more SCRs, *separate from the set of one or more transistors,* coupled to the [AC bus] *second output of the transformer* and coupled to the DC bus; and
- a microcontroller coupled to the set of one or more transistors configured to regulate the current flow through the set of one or more transistors and to regulate the current flow through the set of one or more SCRs.

37. An apparatus for interfacing an AC bus and DC bus, comprising:
- *a transformer coupled to the AC bus having at least a first output and a second output;*
- a set of one or more transistors coupled to the [AC bus] *first output of the transformer* and coupled to the DC bus;
- a set of one or more SCRs, *separate from the set of one or more transistors,* coupled to the [AC bus] *second output of the transformer* and coupled to the DC bus; and
- a first microcontroller coupled to the set of one or more transistors configured to regulate the current flow through the set of one or more transistors and to regulate the current flow through the set of one or more SCRs.

46. A method for interfacing *a DC bus with a transformer coupled to* an AC bus [coupled to] *having* a set of one or more generators [with a DC bus], comprising:
- coupling a set of one or more transistors having a first total power capacity to [the AC bus] *a first output of the transformer* and to the DC bus;
- coupling a set of one or more SCRs, *separately from the set of one or more transistors,* having a second total power capacity to [the AC bus] *a second output of the transformer* and to the DC bus; and
- regulating current flow through the set of one or more transistors and the set of one or more SCRs such that substantially all power flows through the set of one or more transistors when the power load of the DC bus is within a first power range.

55. An apparatus for AC to DC and DC to AC power conversion, comprising:
- a set of one or more transistor packs, each transistor pack configured to operate as a separate unit coupled to an AC bus and DC bus*; and*
- a switch arranged between the AC bus and one of the transistor packs such that the transistor pack is not directly coupled to the AC bus, the switch coupled to the AC bus, an AC load device, and the transistor pack, in which the switch is configured to alternatively couple the transistor pack to the AC bus or the AC load device;
- in which the transistor pack is configured to perform AC to DC power conversion when coupled to the AC bus and the DC bus and to perform DC to AC power conversion when coupled to the DC bus and the AC load device.

\* \* \* \* \*